(12) United States Patent
Pellerin (10) Patent No.: US 9,933,087 B2
(45) Date of Patent: Apr. 3, 2018

(54) ACTUATOR FOR A WATER SPRAY STRUCTURE

(71) Applicant: LES INDUSTRIES SIMEXCO INC., Ste-Julie (CA)

(72) Inventor: Luc Pellerin, Boucherville (CA)

(73) Assignee: LES INDUSTRIES SIMEXCO INC. (CA)

( * ) Notice: Subject to any disclaimer, the term of this patent is extended or adjusted under 35 U.S.C. 154(b) by 0 days.

(21) Appl. No.: 15/419,075

(22) Filed: Jan. 30, 2017

(65) Prior Publication Data

US 2017/0191582 A1   Jul. 6, 2017

Related U.S. Application Data

(63) Continuation of application No. 14/224,557, filed on Mar. 25, 2014, now abandoned.

(60) Provisional application No. 61/804,890, filed on Mar. 25, 2013.

(30) Foreign Application Priority Data

Mar. 25, 2013 (CA) ..................................... 2811108

(51) Int. Cl.
| | |
|---|---|
| *F16K 31/62* | (2006.01) |
| *F16K 15/02* | (2006.01) |
| *F16K 15/18* | (2006.01) |
| *F16K 3/26* | (2006.01) |
| *A63G 31/00* | (2006.01) |

(52) U.S. Cl.
CPC ............ *F16K 31/62* (2013.01); *A63G 31/007* (2013.01); *F16K 3/26* (2013.01); *F16K 15/026* (2013.01); *F16K 15/18* (2013.01)

(58) Field of Classification Search
USPC .............................. 137/366, 625.38; 251/295
See application file for complete search history.

(56) References Cited

U.S. PATENT DOCUMENTS

| | | |
|---|---|---|
| 1,562,979 A | 11/1925 | Muend |
| 1,794,484 A | 3/1931 | Seidel |
| 5,309,941 A | 5/1994 | Lin |
| 5,421,552 A | 6/1995 | Wang et al. |
| 5,464,190 A | 11/1995 | Chang et al. |
| 8,550,928 B2 | 10/2013 | Hamelin |
| 2014/0318643 A1 | 10/2014 | Pellerin |

*Primary Examiner* — John Fox
(74) *Attorney, Agent, or Firm* — Gardner Groff Greenwald & Villanueva, PC (57) ABSTRACT

An actuator system for a fluid playground including a first elongated tubular member defining a first axially extending enclosure and having a first inlet connectable to a fluid source, and a second elongated tubular member positioned within the first tubular member, the second tubular member defining a second axially extending enclosure, and having a second inlet in fluid communication with the first enclosure and an outlet traversing the first tubular member. The outlet is connectable to at least one fluid playground device. A plug element is shaped to removably and sealably close the second inlet of the second tubular member. A resilient member urges the plug element towards sealing engagement with the second tubular member. A pressure exerted on a movable actuating element connected to the plug element causes its displacement away from sealing engagement with the second inlet, thereby allowing fluid flow to the fluid playground device.

13 Claims, 8 Drawing Sheets

ACTUATOR FOR A WATER SPRAY STRUCTURE

CROSS-REFERENCE TO RELATED APPLICATIONS

This application is a continuation of U.S. Non-Provisional patent application Ser. No. 14/224,557 filed Mar. 25, 2014, which claims the benefit of U.S. Provisional Application No. 61/804,890 filed Mar. 25, 2013 and Canadian patent application CA 2,811,108 filed Mar. 25, 2013, the contents of which are incorporated herein by reference.

FIELD OF THE INVENTION

This invention relates generally to play structures for use in a water spray park, a park or a playground. More particularly, the present invention relates to an actuator for use in play structures with overhead water sprays, water spouts or faucets, water cannons and in ground water jets.

BACKGROUND OF THE INVENTION

Recreational water spray parks have grown in popularity over the years. Most water spray parks consist primarily of in-ground jets and above-ground structures that spray the users with water. These water features are normally activated by a mechanical push button or an electronic sensor that activate a play sequence. The duration of this play sequence is controlled by the mechanical push button mechanism or by an electronic control panel installed for that purpose. Some activators are manually activated while others are feet activated. While existing activators are good at activating a sequence of operation, nothing permits a direct control of the water output for one or more water features.

Consequently, there is a need for an actuator system that addresses at least one of the above-mentioned needs.

SUMMARY OF THE INVENTION

An object of the present invention is to propose an actuator system that satisfies at least one of the above-mentioned needs.

According to the present invention, that object is accomplished with an actuator system for a fluid playground, the actuator system comprising:
  a first elongated tubular member defining a first axially extending enclosure and having a first inlet connectable to a fluid source;
  a second elongated tubular member positioned within the first tubular member, the second tubular member defining a second axially extending enclosure, and having a second inlet in fluid communication with the first enclosure and an outlet traversing the first tubular member, the outlet being connectable to at least one fluid playground device;
  a plug element shaped to removably and sealably close the second inlet of the second tubular member;
  a resilient member to urge the plug element towards sealing engagement with the second tubular member; and
  a movable actuating element connected to the plug element;
  wherein a pressure exerted on the movable actuating element causes a displacement of the plug element away from sealing engagement with the second inlet of the second tubular member, thereby allowing fluid flow from the fluid source to the fluid playground device.

A non-restrictive description of a preferred embodiment of the invention will now be given with reference to the appended drawings.

PREFERRED EMBODIMENTS OF THE PRESENT INVENTION

Figure 1A:
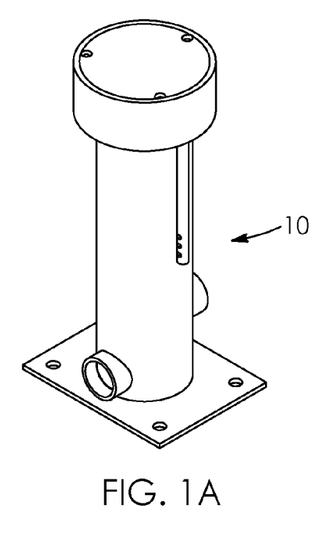
FIGS. 1A to 1D are perspective, front, side and top views respectively of an actuator system according to an embodiment of the present invention.
Figure 1B:
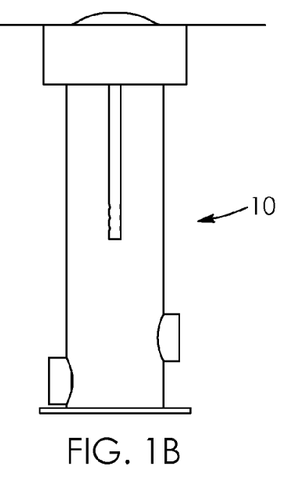
Figure 1C:
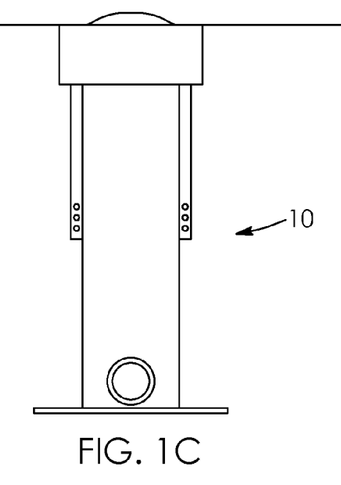
Figure 1D:
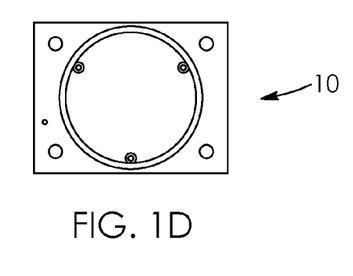
Figure 2A:
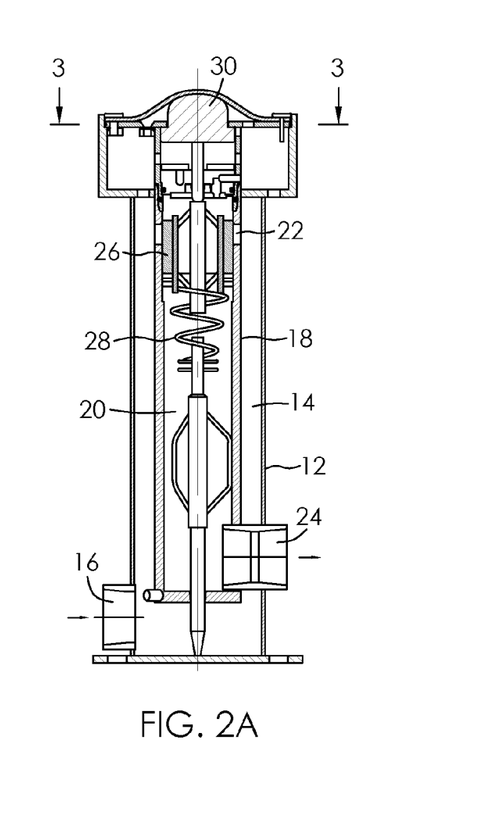
FIGS. 2A and 2B are cut front views of the actuator system shown in FIGS. 1A to 1D, with the movable actuating element in a non-actuated configuration and in an actuated configuration respectively.
Figure 2B:
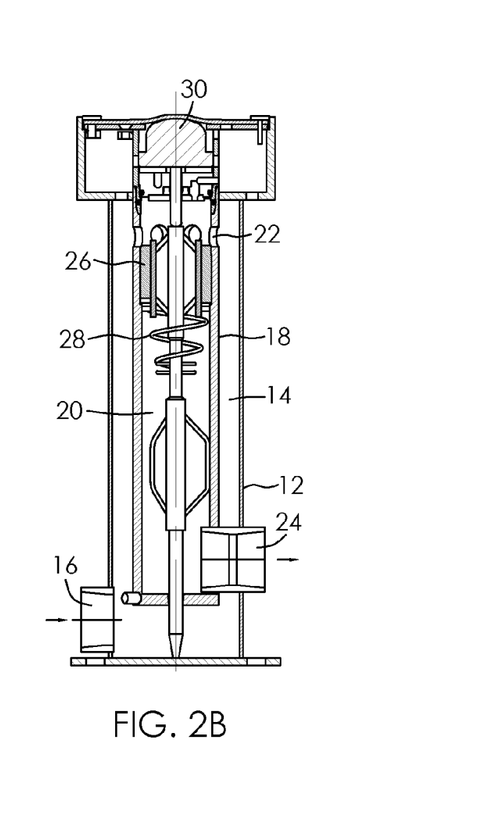
Figure 3:
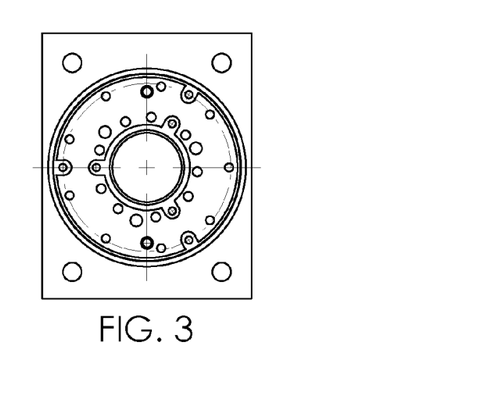
FIG. 3 is a cut view of the actuator system along line A-A of FIG. 2A.
Figure 4A:
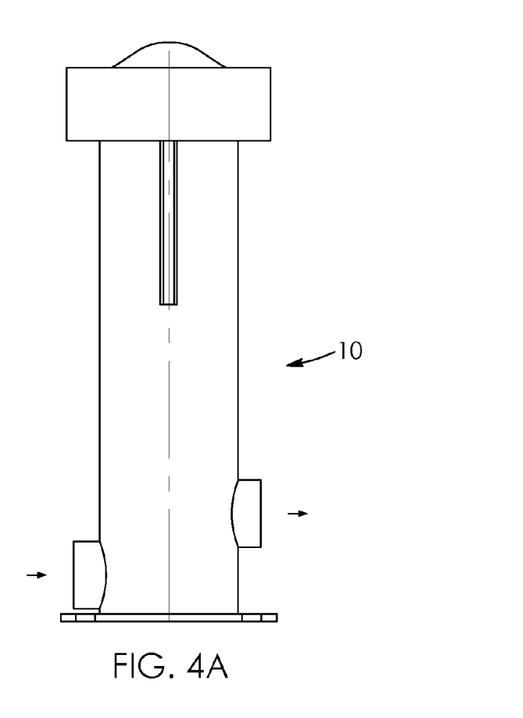
FIGS. 4A to 4C are front, side and top views respectively of an actuator system according to another embodiment of the present invention.
Figure 4B:
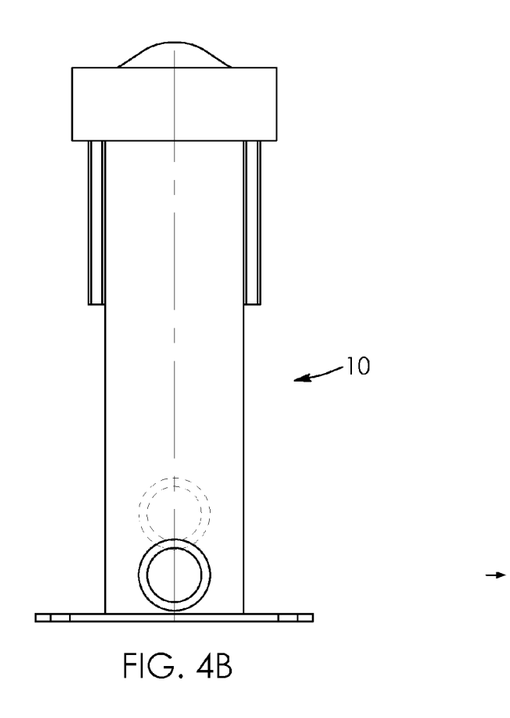
Figure 4C:
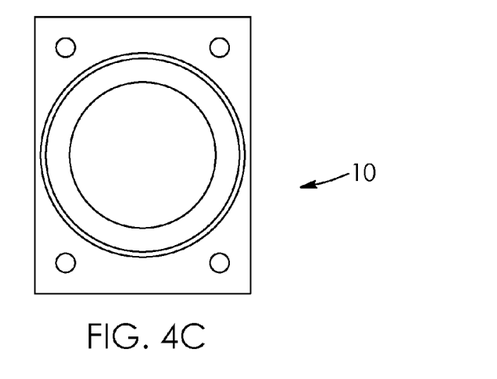
Figure 5A:
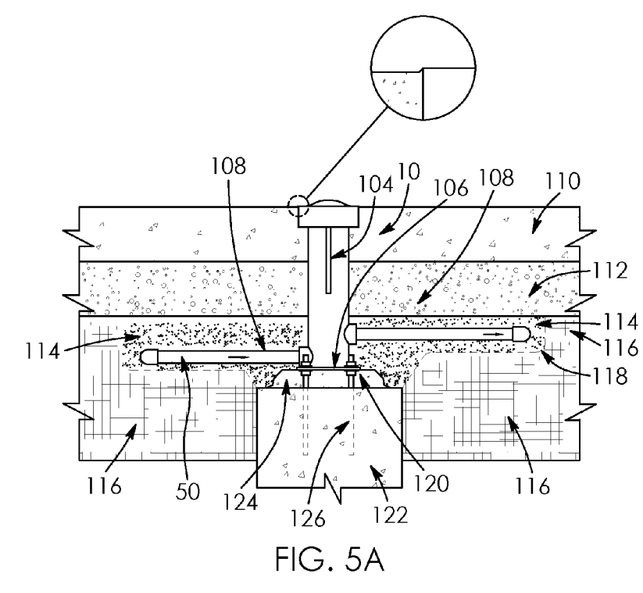
FIGS. 5A and 5B are front and side views respectively showing examples of an installation of the actuator system shown in FIGS. 4A to 4C in the ground.
Figure 5B:
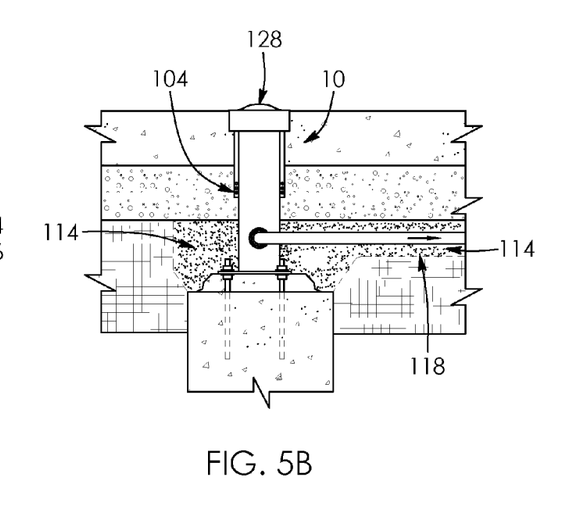
Figure 6:
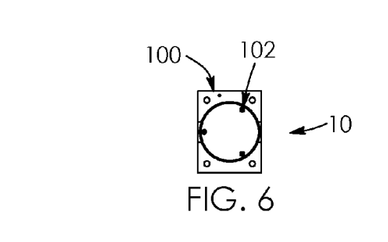
FIG. 6 is a top view of the actuator system shown in FIG. 5A.
Figure 7A:
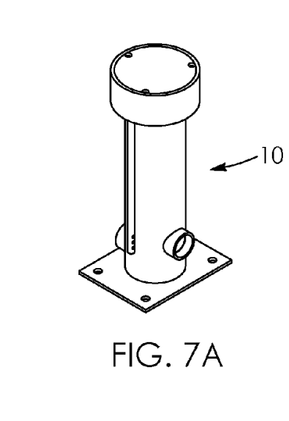
FIGS. 7A to 7D are perspective, front, side and top views respectively of an actuator system according to another embodiment of the present invention.
Figure 7B:
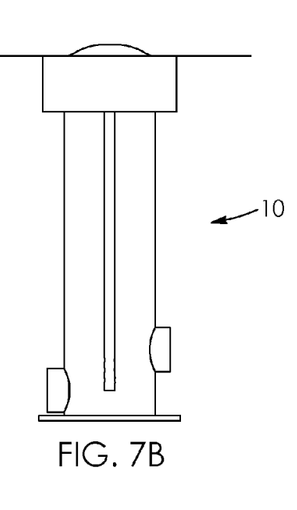
Figure 7C:
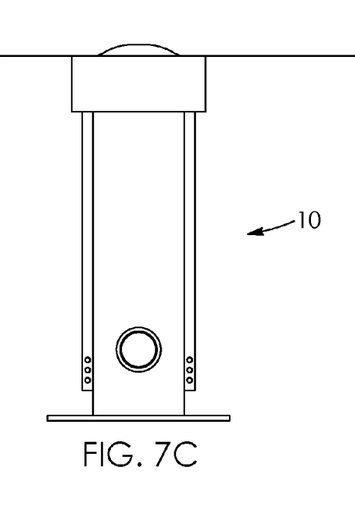
Figure 7D:
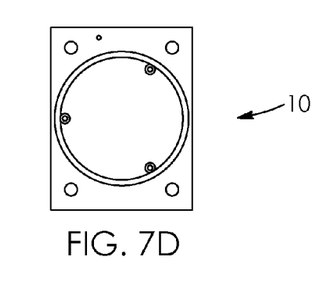
Figure 8A:
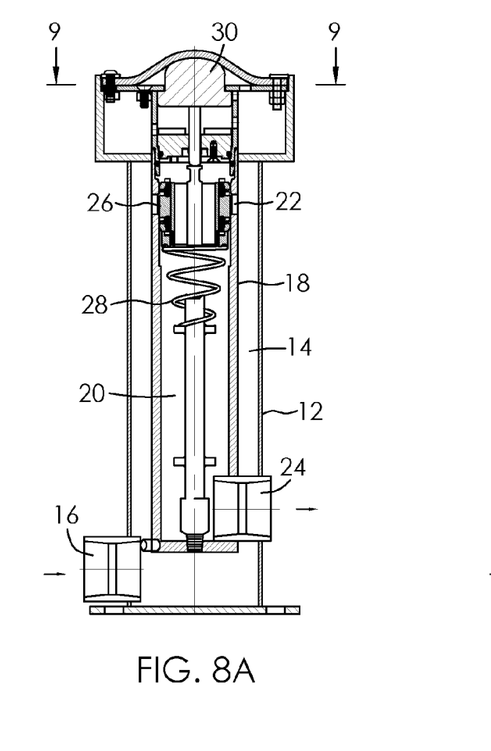
FIGS. 8A and 8B are cut front views of the actuator system shown in FIGS. 7A to 7D, with the movable actuating element in a non-actuated configuration and in an actuated configuration respectively.
Figure 8B:
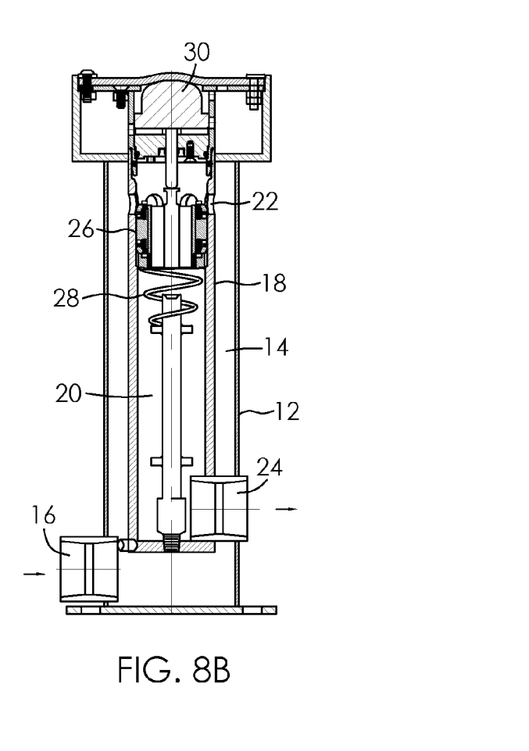
Figure 9:
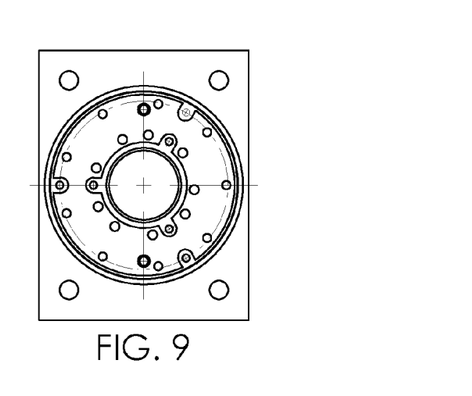
FIG. 9 is a cut view of the actuator system along line A-A of FIG. 8A.
Figure 10A:
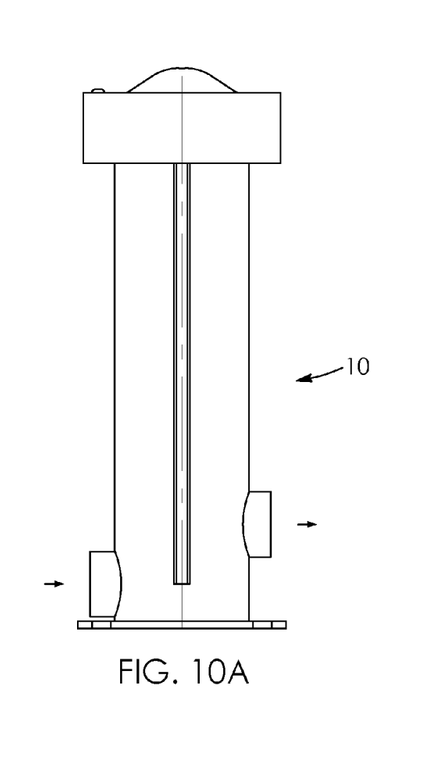
FIGS. 10A to 10C are front, side and top views respectively of an actuator system according to another embodiment of the present invention.
Figure 10B:
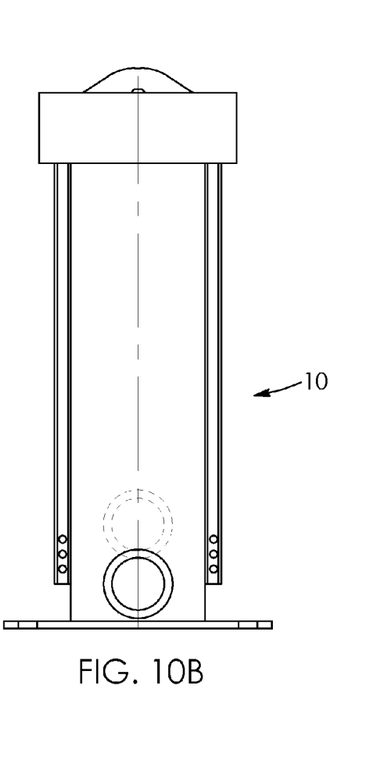
Figure 10C:
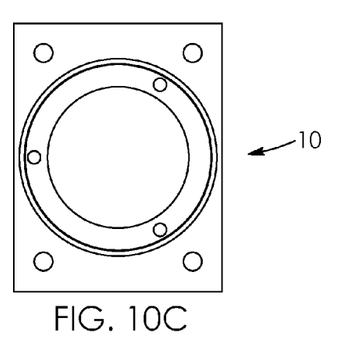
Figure 11A:
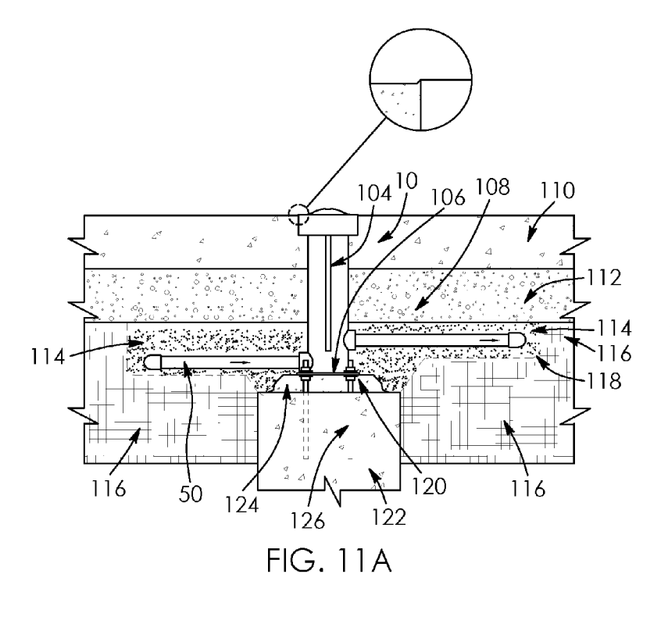
FIGS. 11A and 11B are front and side views respectively showing examples of an installation of the actuator system shown in FIGS. 10A to 10C in the ground.
Figure 11B:
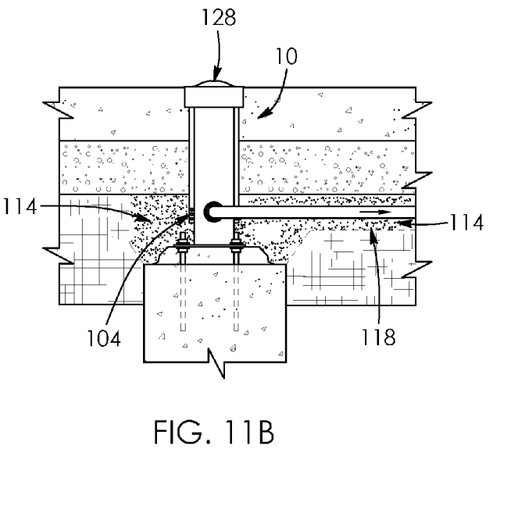
Figure 12:
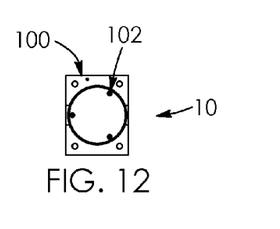
FIG. 12 is a top view of the actuator system shown in FIG. 11A.

Referring to FIGS. 1A to 1D, according to a preferred embodiment of the present invention, an actuator system 10 for a fluid, preferably water, playground is shown. As better shown in FIGS. 2A and 2B, the actuator system 10 includes a first elongated tubular member 12 defining a first axially extending enclosure 14 and having a first inlet 16 connectable to a fluid source 50. A second elongated tubular member 18 is positioned within the first tubular member 12, the second tubular member 18 defining a second axially extending enclosure 20. The second tubular member 18 has a second inlet 22 in fluid communication with the first enclosure 14 and an outlet 24 traversing the first tubular member 12. The outlet 24 is connectable to at least one fluid playground device. A plug element 26 is shaped to removably and sealably close the second inlet 22 of the second tubular member 18. A resilient member 28 urges the plug element 26 towards sealing engagement with the second tubular member 18 as shown in FIG. 2A. A pressure exerted on a movable actuating element 30 connected to the plug element 26 causes a displacement of the plug element 26 away from sealing engagement with the second inlet 22, thereby allowing fluid flow from the fluid source 50 (shown in FIG. 5A) to the fluid playground device.

BELOW IS A LIST OF OTHER ALPHANUMERICAL REFERENCES FOR SOME OF THE CORRESPONDING OPTIONAL COMPONENTS ILLUSTRATED IN THE ACCOMPANYING DRAWINGS 100. ground connection
102. stainless steel anti-theft screws
104. drainage element
106. stainless steel plate
108. water line
110. concrete slab
112. stones linked to French drain (the French drain surrounding the concrete slab
114. sand
116. undisturbed soil
118. geotextile
120. levelling screws
122. concrete base
124. non-retractable concrete
126. stainless steel anchoring
128. rubber cover, varying colors Preferably, the fluid is water.

Preferably, the resilient member is a spring.

Preferably, the second tubular member is coaxially positioned with respect to the first tubular member such that fluid circulates from the first inlet annularly around the second enclosure towards the second inlet, upon actuation of the actuating surface.

Preferably, the fluid playground device is selected from the group comprising water spray structures, water spouts, water cannons, in-ground jets and/or faucets in a spray park.

Preferably, the present invention permits the activation of one or more water spray structures, water spouts, water cannons, in ground jets and or faucets in a spray park, a park or a playground with a mechanically activated push button. By pressing, a movable actuating surface, such as a button, the water playground device will be activated. When pressure from the button is released, the water playground device will immediately stop functioning. The user will be able to directly control the water output of one or more play structures in a spray park, for example.

Having such a feature available can permit the creation of interactive games with an action/reaction feature for water spray parks. At the same time, this can greatly help in reducing the water consumption of each element controlled with such a device, compared to present activators that turn on a play structure for a set period of time even if no one is using the structure or device. Water consumption of a water spray park is a major concern for customers, when installing such as system. Lower water consumption for similar play effect in a spray park offers an important competitive advantage.

FIGS. 7A to 12 show actuator systems according to other embodiments of the invention. In these embodiments, the actuator system components are arranged such that fluid flow to the fluid playground device can be adjustably controlled, and not simply provide on/off control of fluid flow. Hence the amount of fluid flow to the device can be made adjustably dependent on the pressure exerted on the actuating element 20.

Preferably, most of the structure of the actuator system is made of 304L stainless steel. The movable actuating surface can be covered with heavy-duty flexible resilient rubber, having a color that can be selected by the purchaser of the system.

Preferably, the actuator system is entirely mechanical and does not require any electrical input.

Preferably, the actuator system may be disassembled for maintenance purposes even if part of its body is placed in concrete. It can also be circumvented or bypassed if one does not want to use the actuator system.

Preferably, upon providing water from a water source to the actuator system, a user can simply step on the actuating surface in order to allow water flow to the water playground device. A pressure equivalent to a weight of 5 kg can be sufficient. Water will flow to the playground device as long as pressure from a foot is exerted on the actuating surface.

Preferably, the actuator system allows a creation of interactive water games between users. Learning and discovery games can be created when a user can control a water jet remotely from a location. Such a learning scenario can be developed upon use of a plurality of above-described actuator systems within a water playground, wherein a playground device appears to be not directly linked to the actuator system. The surprise of a user that is sprayed by another user can create a new dynamic within a water playground.

Preferably, the actuator system is to be installed within a 35 MPA 406 mm concrete base below a freezing level in the ground, preferably 1524 mm below a finished surface. All actuator system components are preferably grounded.

Preferably, the first inlet and the outlet have 38 mm connectors to connect to the water source and water playground devices.

Preferably, the actuator system further comprises a 6 mm thick anchoring plate and four stainless steel anchoring rods to anchor the actuator system on a concrete base. The actuating surface may further comprise anti-theft locking mechanisms that require a special tool to unlock and release the actuating surface from its installed location and from the components the actuating surface is attached to.

Although preferred embodiments of the present invention have been described in detail herein and illustrated in the accompanying drawings, it is to be understood that the invention is not limited to these precise embodiments and that various changes and modifications may be effected therein without departing from the scope of the present invention.

The invention claimed is:

1. An actuator system for a fluid playground device, the actuator system comprising:
    a first elongated tubular member defining a first axially extending enclosure and having a first inlet connectable to a fluid source;
    a second elongated tubular member positioned within the first tubular member, the second tubular member defining a second axially extending enclosure, and having a second inlet in fluid communication with the first enclosure and an outlet traversing the first tubular member, the outlet being connectable to at least one fluid structure;
    a plug element shaped and sized to removably and sealably close the second inlet of the second tubular member;
    a resilient member to urge the plug element towards sealing engagement with the second tubular member, the resilient member being positioned within the second axially extending enclosure between the second inlet and the outlet connectable to the at least one fluid playground device, the resilient member being traversable by fluid flowing between said second inlet and the outlet; and a movable actuating element connected to the plug element;

wherein a pressure exerted on the movable actuating element causes a displacement of the plug element away from sealing engagement with the second inlet of the second tubular member, thereby allowing fluid flow from the fluid source to the fluid playground device and wherein the movable actuating element further comprises a top surface covered by a flexible resilient material.

2. The actuator system according to claim 1, wherein the fluid is water.

3. The actuator system according to claim 2, wherein the resilient member is a spring.

4. The actuator system according to claim 2, wherein the second tubular member is coaxially positioned with respect to the first tubular member such that fluid circulates from the first inlet annularly around the second enclosure towards the second inlet, upon actuation of the movable actuating element.

5. The actuating system according to claim 2, wherein the movable actuating element adjustably controls a rate of fluid flow between the fluid source and the fluid playground device, the rate of fluid flow being dependent on an amount of pressure exerted on the movable actuating element.

6. The actuating system according to claim 2, wherein said fluid playground device is a spray structure, a water spout, a water cannon, an in ground water jet, a faucet, or a combination thereof.

7. The actuator system according to claim 1, wherein the resilient member is a spring.

8. The actuator system according to claim 7, wherein the second tubular member is coaxially positioned with respect to the first tubular member such that fluid circulates from the first inlet annularly around the second enclosure towards the second inlet, upon actuation of the movable actuating element.

9. The actuating system according to claim 7, wherein the actuation system adjustably controls a rate of fluid flow between the fluid source and the fluid playground device, the rate of fluid flow being dependent on an amount of pressure exerted on the movable actuating element.

10. The actuating system according to claim 7, wherein said fluid playground device is a spray structure, a water spout, a water cannon, an in ground water jet, a faucet, or a combination thereof.

11. The actuator system according to claim 1, wherein the second tubular member is coaxially positioned with respect to the first tubular member such that fluid circulates from the first inlet annularly around the second enclosure towards the second inlet, upon actuation of the actuating element.

12. The actuating system according to claim 1, wherein the movable actuating element adjustably controls a rate of fluid flow between the fluid source and the fluid playground device, the rate of fluid flow being dependent on an amount of pressure exerted on the movable actuating element.

13. The actuating system according to claim 1, wherein said fluid playground device is a spray structure, a water spout, a water cannon, an in ground water jet, a faucet, or a combination thereof.

* * * * *